(12) United States Patent
Blair

(10) Patent No.: US 6,306,294 B1
(45) Date of Patent: Oct. 23, 2001

(54) COOKING OIL FILTERING APPARATUS

(76) Inventor: Robert Ian Blair, Unit 1, 388 Lytton Road, Morningside, Queensland 4170 (AU)

(*) Notice: Subject to any disclaimer, the term of this patent is extended or adjusted under 35 U.S.C. 154(b) by 0 days.

(21) Appl. No.: 09/581,458
(22) PCT Filed: Dec. 8, 1998
(86) PCT No.: PCT/AU98/01022
  § 371 Date: Jun. 12, 2000
  § 102(e) Date: Jun. 12, 2000
(87) PCT Pub. No.: WO99/32023
  PCT Pub. Date: Jul. 1, 1999

(30) Foreign Application Priority Data

Dec. 10, 1997 (AU) ................................................. PP0833
Mar. 11, 1998 (AU) ................................................. PP2276

(51) Int. Cl.[7] ............................. A47J 37/12; B01D 35/26
(52) U.S. Cl. .................... 210/167; 210/241; 210/247; 210/257.1; 210/258; 210/473; 210/DIG. 8; 99/408
(58) Field of Search ............................... 210/167, 195.1, 210/196–197, 238, 241, 244, 247, 252, 256, 257.1, 258, 416.1, 464, 473, 474, 475, DIG. 8; 99/408

(56) References Cited

U.S. PATENT DOCUMENTS 2,477,404 * 7/1949 Butt, Jr. .
4,591,434 * 5/1986 Prudhomme .

FOREIGN PATENT DOCUMENTS

2146547 A * 4/1985 (GB) .

* cited by examiner

Primary Examiner—Joseph W. Drodge
Assistant Examiner—Terry K. Cecil
(74) Attorney, Agent, or Firm—Abelman, Frayne & Schwab

(57) ABSTRACT

A filtering apparatus for cooking oil includes an open top reservoir 11 mounted to a portable stand 17 having wheels. The reservoir includes a bridge portion 14 supporting a filter housing 30 therein. A pump 31 is mounted to the stand below the reservoir. A flexible conduit 39 is provided for extracting cooking oil from a deep fryer and for discharging cooking oil from the reservoir back to the fryer. The flexible conduit is in fluid communication with the pump 31 via a first rigid conduit 37 and the pump is in fluid communication with the filter housing via a second rigid conduit 42. Advantageously, the rigid conduits are located within the reservoir so that there is little danger of an operator making contact with the conduits and being burned in the normal course of operation. Furthermore any leaks which develop in the conduits will discharge directly into the reservoir. Preferably, a deflector plate 49 is provided above the oil outlet 45 in order to deflect blow-back oil downwardly.

12 Claims, 3 Drawing Sheets

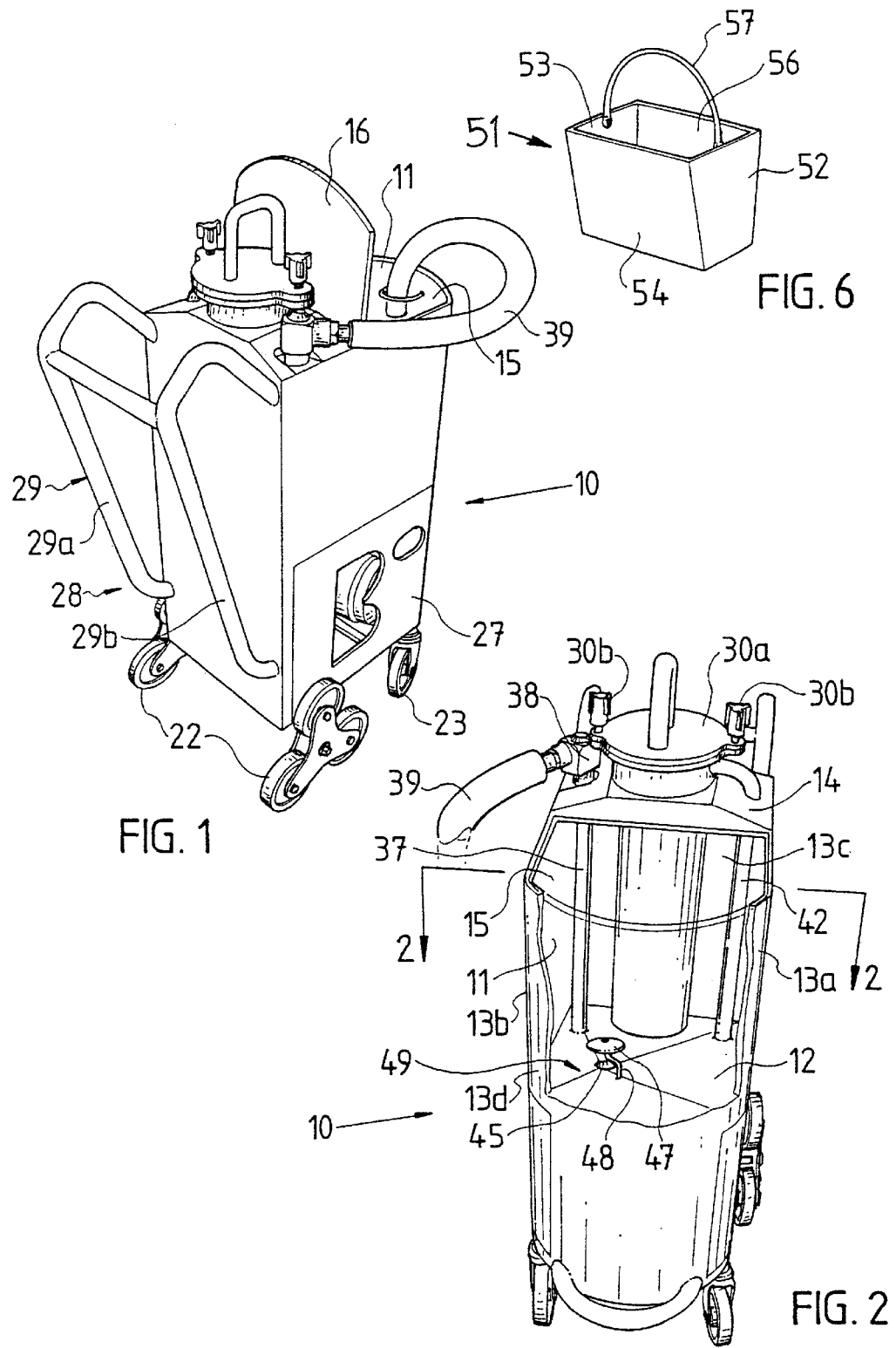

Сooking Oil Filtering Apparatus

COOKING OIL FILTERING APPARATUS

TECHNICAL FIELD OF THE INVENTION

This invention relates to filtering apparatus and has particular application to apparatus for use in filtering cooking oil, particularly cooking oil used in deep fryers and for illustrative purposes reference will be made to such application, However, it is to be understood that the invention could be used in other applications where oil or similar fluids need to be filtered for reuse.

BACKGROUND ART

The presently available filtering apparatus for use in filtering cooking oils has some drawbacks. Notably the oil conduits are generally fully exposed and therefore dangerous to operators as it will be appreciated that cooking oil is normally filtered when hot and operators making contact with exposed conduits can suffer severe burns. Furthermore, conduits are subject to leaks particularly at joints and very hot oil can accidentally spray onto operators or other persons nearby if a leak develops. Additionally the exposed conduits Are difficult to keep clean as dust generally settles on them and remains there due partly to the existence of a film of oil thereon.

Another problem with the presently available apparatus is that the electric drive motors are difficult to remove and replace for maintenance because they are wired into switch gear which is typically mounted on a frame or other component of the apparatus and such wiring needs to be disconnected to allow removal of the motor.

Yet another problem with the presently available apparatus is that air bubbles can be created in the conduits particularly when the drive motor is reversed and such air bubbles can cause blow back through the oil reservoir with the possibility of spraying hot oil over the operators.

It is an object of the present invention to provide filtering apparatus which is less dangerous to operators than those presently available. It is a further object to provide apparatus which requires less cleaning. It is yet a further object to provide filtering apparatus which can be more easily maintained particularly with regard to replacing the electric drive motor.

DISCLOSURE OF THE INVENTION

With the foregoing in view, the invention resides broadly in filtering apparatus for filtering cooking oil, including:

an open top reservoir mounted on a stand which is supported for movement across a floor by wheels, said reservoir having a base wall, side walls upstanding from said base wall and a bridge portion extending between opposite ones of said side walls at or near their upper ends;

a filter housing mounted in said reservoir and supported by said bridge portion, said filter housing having a removable filter cap above said bridge portion and a filter mounted in said filter housing;

pump means mounted to said stand below said reservoir;

a first flexible conduit in selective fluid communication with said pump means for extracting cooking oil from a deep fryer adjacent the apparatus and for discharging cooking oil from said reservoir to the deep fryer, said flexible conduit communicating with said pump means via a first rigid conduit extending through said reservoir from said base wall to said bridge portion, said flexible conduit being connected to said first rigid conduit above said bridge portion and said first rigid conduit being connected to said pump means below said base wall by a second flexible conduit and said reservoir selectively communicating with said pump means via an outlet in said base wall, said pump means being in selective communication with said filter housing for pumping cooking oil through said filter and into said reservoir via a second rigid conduit extending through said reservoir from said base wall, and control means for controlling and/or directing the flow of cooking oil to and from said reservoir.

Preferably, said pump includes an electric motor and reversible flow pump drivingly connected by one or more Vee belts. Advantageously, such arrangement allows removal of the motor from the apparatus without uncoupling any of the conduits from the pump. Furthermore, the heat from the cooking oil is distanced from the motor by the length of the Vee belts thus allowing the motor to run cooler than with a close coupled pump and motor. It is also preferred that the control means which typically includes an on/off switch and forward/reverse switch be mounted on a control panel which in turn is mounted on the motor and cabled directly into the motor with a power input plug or socket adapted for quick release connection to mains power, thus allowing the motor and control panel to be removed together as a unit without requiring disconnection of any electrical wires or cables for servicing and/or replacement.

Preferably, said oil outlet is in fluid communication with said pump means via a third conduit and said oil outlet opens into said reservoir at its lowest point. It is also preferred that blow back protection means be provided in said reservoir for preventing oil being blown back through said oil outlet and out through said open top of said reservoir where it could harm an operator. Such blowback can occur in some apparatus if the pump is switched quickly from forward to reverse and vice versa. In a preferred form the blow back protection means includes a deflector plate mounted above and spaced from the oil outlet in such manner that any oil being forced into the reservoir though the oil outlet is deflected downwardly and/or outwardly. It will be appreciated that it is often necessary to filter the oil immediately after cooking and cooking oil can cause serious burns at normal cooking temperature. In a preferred form said blow back protection means includes a deflector plate mounted above and spaced from said oil outlet in such manner that oil being forced into the reservoir though said oil outlet is deflected downwardly and/or outwardly.

Preferably, the filtering apparatus includes a handle assembly having two spaced apart elongate side members attached at one end to said rear wall adjacent its upper end and at their other ends to said stand adjacent its lower end, said side members diverging outwardly and upwardly from said stand and said rear wall so that the apparatus when layed rearwardly is supported at least in part by said side members with said rear wall being slightly inclined towards the upright position.

BRIEF DESCRIPTION OF THE DRAWINGS

Other features and advantages of the invention will be apparent from the practical embodiment of the invention described in relation to the accompanying drawings wherein:

FIG. 1 is a pictorial representation of apparatus according to the invention from a side rear perspective with the reservoir lid open;

FIG. 2 is a pictorial representation of the apparatus of FIG. 1 from a front perspective with the reservoir lid removed and the front wall of the reservoir partially cut away to show the interior;

FIG. 6 is a pictorial representation of a bucket adapted to fit neatly into the open top of the reservoir;

DETAILED DESCRIPTION OF THE DRAWINGS

Figure 3:
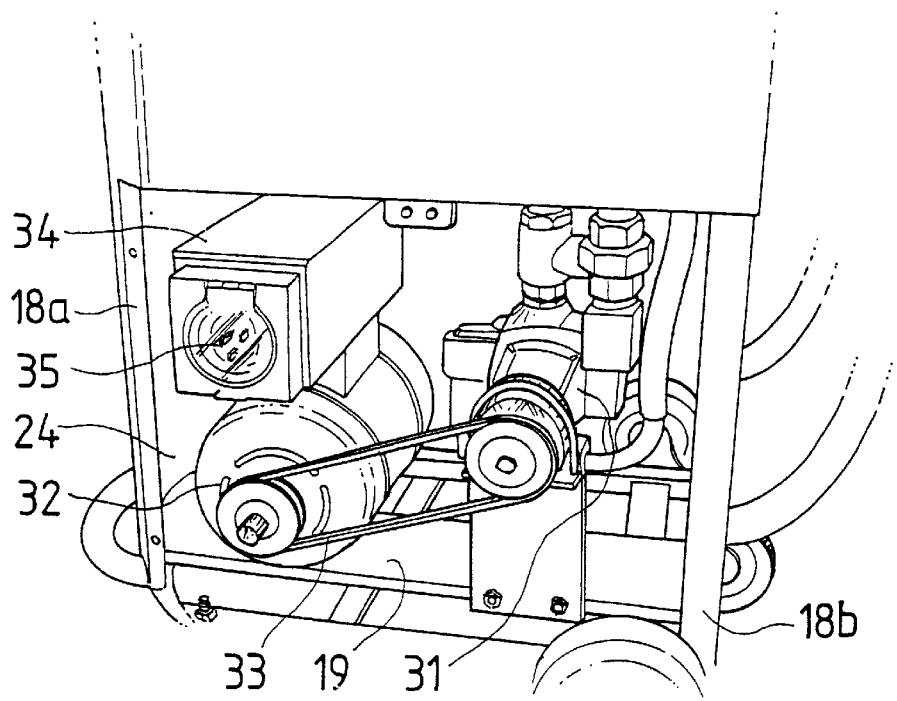
FIG. 3 is a pictorial representation of part of the apparatus of FIG. 1 with one of the side panels removed showing the motor and pump mechanisms from one side.
Figure 4:
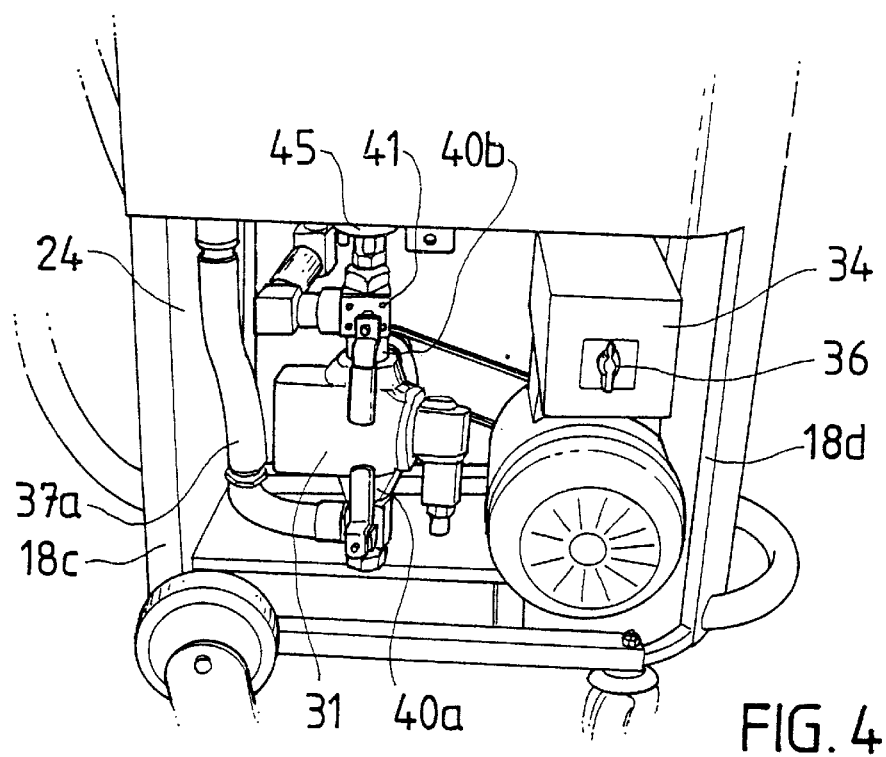
FIG. 4 is a pictorial representation of part of the apparatus of FIG. 1 with the opposite side panel removed showing the motor and pump mechanisms from the other side.
Figure 5:
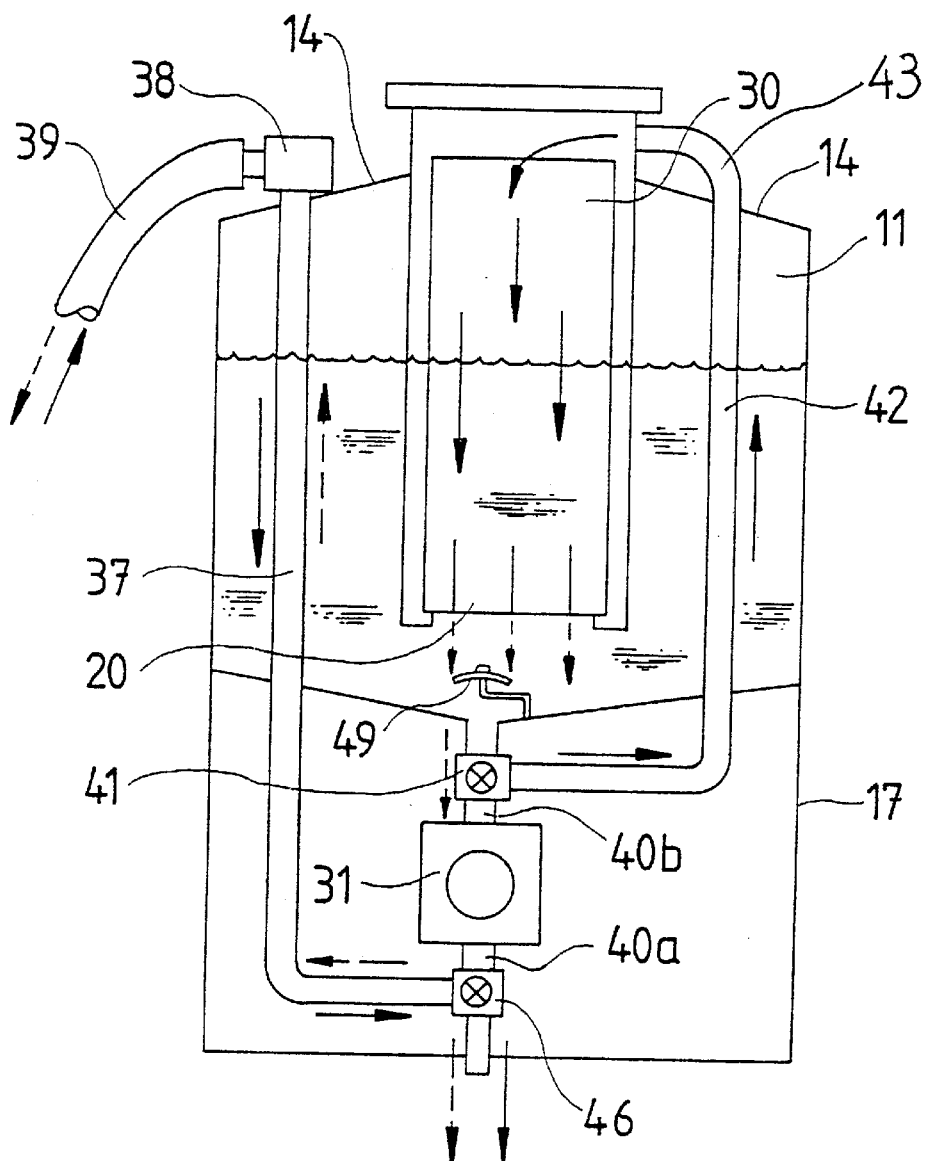
FIG. 5 is a schematic partial sectional elevation of the apparatus of FIG. 2 along line 2—2 showing the direction of oil flow.

The filtering apparatus 10 illustrated in the drawings includes a reservoir 11 formed by a base wall 12, two opposed side walls 13a and 13b a rear wall 13c and a front wall 13d. Notably the two sides walls and the rear wall are generally planar in form whilst the front wall is curved. The top of the reservoir is partly closed by a bridge portion 14 which extends across from side wall to side wall covering almost half of the 35 top and leaving an opening 15 which may be closed by a pivotally mounted lid 16.

The reservoir is supported on a stand 17 comprising four legs 18a, 18b, 18c and 18d and a base frame 19. A pair of rear wheel assemblies 22 adapted for walking up and down stairs support the stand at the rear whilst two spaced apart castor wheels 23 support it at the front. A space 24 is provided within the stand beneath the reservoir in which a pump and motor and various other components as will be described later are mounted. Removable side panels 27 and 28 are fitted to the frame as shown in FIG. 1 to protect the motor and pump from damage and to improve the overall appearance of the apparatus.

A handle assembly 29 is attached to the rear wall of the reservoir at the top and to the stand 17 having two spaced apart elongate members 29a and 29b diverging outwardly and upwardly from the frame so that the apparatus when layed rearwardly is supported by the handle assembly and the rear wheels with the reservoir being slightly inclined towards the upright position. Advantageously this prevents spillage of any residual oil in the reservoir while the apparatus is in transit in the laid over position in a vehicle. A filter housing 30 is mounted to the bridge portion 14 and extends downwardly into the reservoir 11 and has an oil outlet 20 at its lower end through which oil can enter the reservoir after passing through the filter. A filter (not shown) is retained in the filter housing by a filter cap 30a which is releasably secured to the top part of the filter housing by a pair of wing nuts and bolts 30b.

A pump 31 is mounted in the space 24 and driven by a motor 32 and vee belt 33. A control switchgear box 34 is mounted directly to the motor frame and includes an on/forward/reverse switch 36 at one end of the control box. At the other end the control box has a three pin electrical plug 35 for attachment of a standard single phase electrical lead. The power supply cables to the motor are connected to the switch 36 inside the box 34. Advantageously the motor and switch gear can be removed as a complete unit from the space 24 without having to disconnect any wires. The pump is a reversible flow pump so that the inlet becomes the outlet upon reversing of the direction of rotation of the electric motor.

A rigid stainless steel inlet conduit 37 is connected to the 35 bottom port 40a of the pump for extracting cooking oil from a deep fryer and for returning the cooking oil to the deep fryer after filtering. As more clearly shown in FIG. 2 the conduit 37 extends upwardly through the reservoir and terminates in a pivoting elbow 38 to which a flexible hose 39 is connected having a free end (shown in a stowed position in the reservoir) and held by a steel ring attached to the front wall of the reservoir which can be dropped into the deep fryer. At its other end the conduit 37 is connected to the pump via a short piece of flexible conduit 37a. The other port 40b of the pump (at the top) is connected to the reservoir via a valve assembly 41 and reservoir oil outlet 45 so that oil in the reservoir can be pumped back to the deep fryer via the inlet conduit 37 and the flexible hose 39. The top port of the pump is also connected to a second rigid conduit 42 by another short flexible conduit (not shown) which extends upwardly through the reservoir from the base 12 and through the bridge portion 14 to connect with the upper part of the filter chamber 30 via an elbow 43 just below the filter cap. Flow of oil from the top port of the pump is controlled by the valve 41 so that oil being extracted from the deep fryer is pumped upwardly through the conduit 42 and into the filter housing from where it flows down into the reservoir 11. Once all the oil is filtered, the valve assembly 41 is adjusted and the pump is reversed via the switch 36 so that the oil is pumped from the reservoir through the conduit 37 and back into the deep fryer. If necessary, oil can be drained to waste through valve assembly 46 which is attached to the bottom port.

It will be appreciated that the two stainless steel conduits 37 and 42 are housed within the reservoir so that there is little danger of an operator making contact with the conduits and being burned in the normal course of operation. It will also be appreciated that the inlet conduct 37 will be the hottest part of the flow path. Furthermore any leaks which develop in the conduits will discharge directly into the reservoir.

A blow back protection device 49 is mounted in the reservoir and includes a downwardly concave circular cap 47 which is slightly larger than the oil outlet 45. The cap is mounted on one leg of a z-shaped bolt 48 having the other leg welded to the base of the reservoir adjacent the oil outlet. The said one leg extends upwardly and is coaxial with the axis of the oil outlet. It will be understood that the cap is thus secured directly above and spaced from the outlet wherein any oil being blown back through the oil outlet will be deflected sidewardly and/Dr downwardly.

A bucket 51 which is shaped to neatly fit into the reservoir 11 for easy transport and storage is also provided. The bucket is also shaped to fit under narrow deep fryers for collection of oil therefrom via bottom outlets and provides a temporary reservoir into which the free end of the hose 39 can be placed for removal of the oil. It will be seen that the bucket has two spaced apart end walls 52 and 53 which taper inwardly to a narrower base and two rectangular side walls 54 and 56 and a handle 57 extending between the two end walls.

It should be understood that while the foregoing description has been given by way of illustrative example of the invention, all modifications and variations thereto as would be apparent to persons skilled in the art are deemed to fall within the broad scope and ambit of this invention as is defined in the appended claims.

What is claimed is:

1. Filtering apparatus for filtering cooking oil, including:
   an open top reservoir mounted on a stand which is supported for movement across a floor by wheels, said reservoir having a base wall, side walls upstanding from said base wall and a bridge portion extending between opposite ones of said side walls at or near their upper ends;

a filter housing mounted in said reservoir and supported by said bridge portion, said filter housing having a removable filter cap above said bridge portion and a filter mounted in said filter housing;

pump means mounted to said stand below said reservoir;

a first flexible conduit in selective fluid communication with said pump means for extracting cooking oil from a deep fryer adjacent the apparatus and for discharging cooking oil from said reservoir to the deep fryer, said flexible conduit fluidly communicating with said pump means via a first rigid conduit extending through said reservoir from said base wall to said bridge portion, said flexible conduit being connected to said first rigid conduit above said bridge portion and said first rigid conduit being connected to said pump means below said base wall by a second flexible conduit and said reservoir selectively fluidly communicating with said pump means via an oil outlet in said base wall, said pump means being in selective fluid communication with said filter housing for pumping cooking oil through said filter and into said reservoir via a second rigid conduit extending through said reservoir from said base wall, and control means for controlling and/or directing the flow of cooking oil to and from said reservoir.

2. Filtering apparatus according to claim 1, wherein said pump means includes an electric motor and reversible flow pump, said pump and said electric motor being drivingly connected by one or more Vee belts and said pump being spaced from said electric motor.

3. Filtering apparatus according to claim 2, wherein said control means includes a control panel mounted to said electric motor, said control panel having a power input plug or socket adapted for quick release connection to a main power source and a power output cable connected directly to said electric motor.

4. Filtering apparatus according to claim 3, wherein said control panel includes forward/reverse switch means for controlling the direction of flow through said pump.

5. Filtering apparatus according to claim 2, wherein said control means includes a manually operable valve for directing flow to said pump through either said first rigid conduit or said oil outlet in said base wall of said reservoir.

6. Filtering apparatus according to claim 1, wherein said oil outlet is in fluid communication with said pump means via a third conduit and said oil outlet opens into said reservoir at said reservoir's lowest point.

7. Filtering apparatus according to claim 6, wherein blow back protection means is provided in said reservoir for preventing oil being blown back through said oil outlet and out through said open top of said reservoir.

8. Filtering apparatus according to claim 7, wherein said blow back protection means includes a deflector plate mounted above and spaced from said oil outlet in such manner that oil being forced into the reservoir though said oil outlet is deflected downwardly and/or outwardly.

9. Filtering apparatus according to claim 1, wherein said bridge portion covers about half of the top of said reservoir and said reservoir includes a closure for closing said open top, said closure being pivotally mounted to said bridge portion for movement from a closed position to an open position.

10. Filtering apparatus according to claim 1, wherein said side walls include two opposite generally planar side walls, a generally planar rear wall and a curved front wall.

11. Filtering apparatus according to claim 10, including a handle assembly having two spaced apart elongate side members attached at one end to said rear wall adjacent said rear wall's upper end and at their other ends to said stand adjacent said stand's lower end, said side members diverging outwardly and upwardly from said stand and said rear wall so that the apparatus when layed rearwardly is supported at least in part by said side members with said rear wall being slightly inclined towards the upright position.

12. Filtering apparatus according to claim 3, wherein said control means includes a manually operable valve for directing flow to said pump through either said first rigid conduit or said oil outlet in said base wall of said reservoir.

* * * * *